March 18, 1952  B. M. WOJCIECHOWSKI  2,589,758
METHOD AND APPARATUS FOR MAKING ELECTRICAL MEASUREMENTS
Filed July 22, 1948  2 SHEETS—SHEET 1
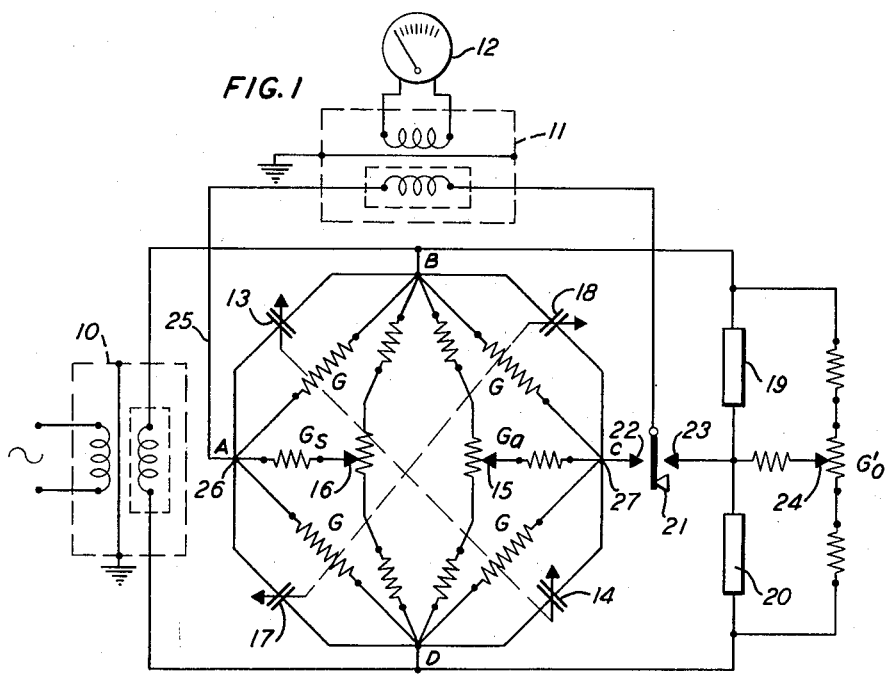
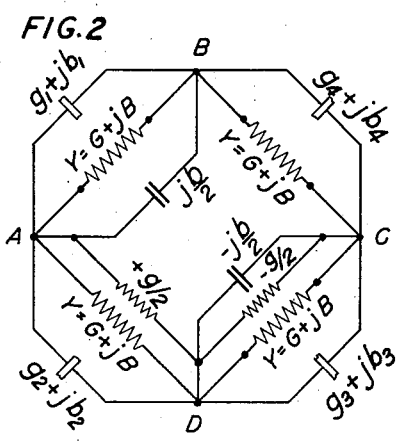
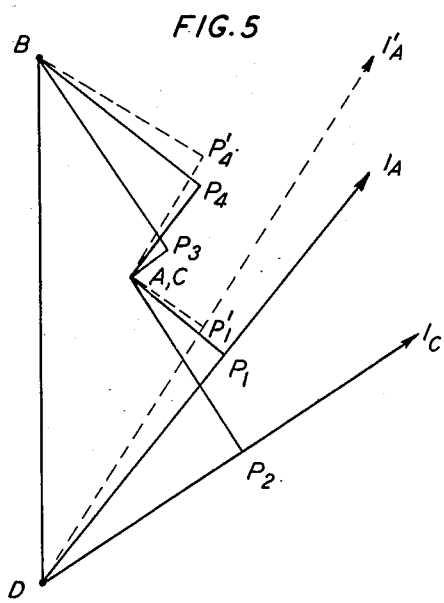
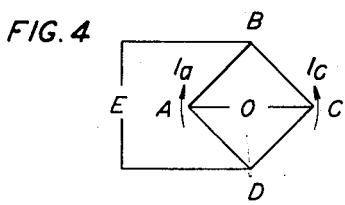
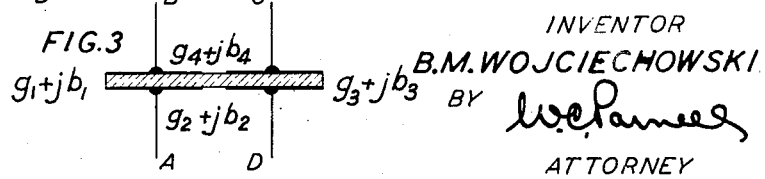
INVENTOR
B.M. WOJCIECHOWSKI
BY
ATTORNEY March 18, 1952  B. M. WOJCIECHOWSKI  2,589,758
METHOD AND APPARATUS FOR MAKING ELECTRICAL MEASUREMENTS
Filed July 22, 1948  2 SHEETS—SHEET 2

INVENTOR
B.M. WOJCIECHOWSKI
BY
ATTORNEY

Patented Mar. 18, 1952

2,589,758

UNITED STATES PATENT OFFICE 2,589,758

METHOD AND APPARATUS FOR MAKING ELECTRICAL MEASUREMENTS

Bogumil M. Wojciechowski, New York, N. Y., assignor to Western Electric Company, Incorporated, New York, N. Y., a corporation of New York Application July 22, 1948, Serial No. 40,073

16 Claims. (Cl. 175—183)

This invention relates to admittance measurements of four-terminal networks and particularly to the measurement of conductance or susceptance unbalances in such networks.

A conventional, alternating current bridge measuring network includes two, usually equal, ratio arms in which the phase and absolute values are adjusted as closely as possible since any misadjustment between the arms in phase angle or impedance may produce appreciable measurement errors. It also is recognized that any unknown electrical network connected across any of the ratio arms of such a bridge may affect the accuracy of measurement. The use of such a conventional bridge network, therefore, is limited to determining the absolute values of two-terminal networks and the unbalances in two-branch networks connected across the arms adjacent to the ratio arms of the bridge.

In the manufacture of complex electrical apparatus, however, it is often important to determine the magnitude of the electrical unbalances in four-terminal networks. One such network commonly used in electric filters comprises a double, piezo-electric crystal in which the admittance between any two of the four terminals is primarily susceptance but also includes a small amount of conductance. One criterion of the quality of such networks as filter elements, is the value of the conductance unbalance which must be less than some small, specified value. This unbalance is defined as the difference between the two sums of the conductances of the two pairs of opposite arms of the four-branch network.

In one known method of measuring these unbalances, the four terminals of the network are connected to the corresponding four terminals of a bridge having four conductances as the ratio arms, the usual source of alternating current is connected between one pair of diagonally opposite terminals, the usual detector is connected across the other conjugate pair of terminals and two ganged condensers are connected respectively across the two arms of an opposite pair for effecting a susceptance balance before determining the conductance unbalance in the network under test. This type of measuring apparatus has been found difficult to maintain in good working order, particularly because the requirements for differential sensitivity and capacitance balance are unusually high and, when the apparatus is disturbed, laborious readjustments of the circuits are required. The accuracy of this apparatus also is found to vary with certain electrical characteristics of the product tested and particularly with the magnitude of the total susceptance unbalances across the arms of the bridge.

The object of this invention is a method and apparatus for making admittance measurements whereby unbalances in one admittance component of four-terminal networks may be measured quickly and accurately in the presence of unbalances in the other admittance component.

According to the principal feature of the invention the error in measurement of the unbalance in one admittance component of such networks, due to unbalances in the other admittance component and in the measuring apparatus itself, is eliminated by adjusting the total values of the other admittance components across the arms of the bridge so that, when the bridge is balanced, the difference in the total values across the two arms of one opposite pair is equal to the difference in the total values across the two arms of the other, opposite pair. To facilitate the making of these adjustments, a conductance bridge, with the usual susceptance balancing means in one pair of opposite arms, is provided, according to this invention, with an additional pair of ratio arms and with means for switching the balance indicator between the main bridge and a second bridge in which the added arms replace two arms of the main bridge. For making a susceptance balance of each of the secondary bridges, two similar but differentially ganged condensers are connected across the other arms, respectively, of the main bridge.

With such a network it is possible to measure conductance unbalances in four-terminal networks to a high degree of accuracy notwithstanding the fact that there may be susceptance unbalances in the network under test or in the bridge itself.

By changing all the circuit elements of the bridge network to their admittance counterparts, it is possible, when making susceptance unbalance measurements, to eliminate errors due to conductance unbalances.

These and other features of the invention will be better understood from the following detailed description and the accompanying drawing in which:

Fig. 1 is a schematic diagram of a measuring circuit according to the invention;

Fig. 2 is a known type of bridge circuit for measuring conductance unbalance in four-terminal networks;

Fig. 3 is the equivalent circuit of a four-terminal network such as a piezo-electric crystal element of a type used in filters;

Fig. 4 is a schematic diagram and Fig. 5 is a vector diagram; which together illustrate how unbalances in one admittance component of such networks affect the measurement of unbalances in the other admittance component when using known types of measuring apparatus.

Figure 6:
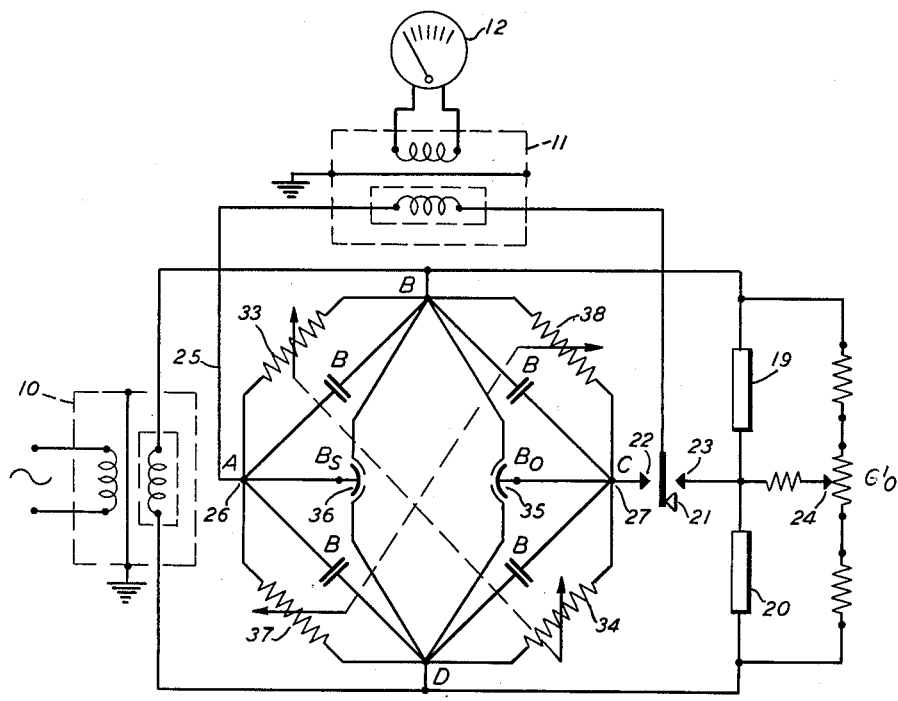
Fig. 6 is a measuring circuit according to the invention, which enables susceptance to be measured in the presence of conductance unbalance.

Referring first to Fig. 4, points A, B, C and D are the four terminals of a conductance unbalance bridge having an alternating current source "E" connected across the B and D terminals and a balance indicator "O" connected across the A and C terminals. It is assumed that a four-terminal network is superimposed on the bridge so that the total impedance of each arm, such as AB, comprises the impedance of the arm itself in parallel with the impedance between two terminals of the network. When the bridge is balanced, the points A and C are at the same potential as indicated in Fig. 5, and if there is no capacity unbalance in the network or in the arms of the bridge itself, the conductance components of the arms DA, AB, BC and CD are $DP_1$, $AP_4$, $CP_3$, $DP_2$, respectively, as shown in full lines. If, however, for example the capacity of arm AB is incorrect, the phase and magnitude of $I_A$ changes and becomes $I'A$. Then, when the bridge is balanced, $DP_1$ becomes $DP'_1$ and $AP_4$ becomes $AP'_4$ and since these vectors differ in magnitude from their former values, it is apparent that a capacity unbalance produces an error in the conductance readings.

The theory of the present invention and the manner in which it effects the desired result are more clearly evident from a consideration of the following mathematical analysis and solution of the problem involved.

In the known type of bridge for measuring unbalances in four-terminal networks, as shown in Fig. 2, the admittance of the ratio arms AB and DC are each $Y = G + jB$ and the admittances of the superimposed network are:

$$AB\text{-arm} = g_1 + jb_1$$
$$AD\text{-arm} = g_2 + jb_2$$
$$DC\text{-arm} = g_3 + jb_3$$
$$BC\text{-arm} = g_4 + jb_4$$

To balance the bridge, i. e. to bring points A and C to the same potential, the conductance "$g$" connected across arms AD and DC is varied, and the condensers (susceptances—$jb/2$) connected across the arms AB and DC are adjusted to increase or decrease the total susceptances of these arms by equal amounts. For small increments the susceptance "$b$" is approximately equal to:

$$b = (b_1 + b_3) - (b_2 + b_4) \qquad (2)$$

where $b_1$, $b_2$, $b_3$ and $b_4$ are the susceptances of the respective branches of the superimposed network under measurement as stated above.

The total admittances across the bridge arms will be respectively:

$$Y_{AB} + (G + g_1) + j(B + b_1 - b/2)$$
$$Y_{AD} = (G + g_2 + g/2) + j(B + b_2)$$
$$Y_{CD} = (G + g_3 - g/2) + j(B + b_3 - b/2)$$
$$Y_{BC} = (G + g_4) + j(B + b_4)$$

Assume that:

$$B_0 = B + \frac{b_2 + b_4}{2} \qquad (3)$$

Substituting the expressions (2) and (3) into the irreal terms of the above equations, we obtain:

$$Y_{AB} = (G + g_1) + j\left(B_0 + \frac{b_1 - b_3}{2}\right) \qquad (4.1)$$

$$Y_{AD} = (G + g_2 + g/2) + j\left(B_0 + \frac{b_2 - b_4}{2}\right) \qquad (4.2)$$

$$Y_{CD} = (G + g_3 - g/2) + j\left(B_0 - \frac{b_1 - b_3}{2}\right) \qquad (4.3)$$

$$Y_{BC} = (G + g_4) + j\left(B_0 - \frac{b_2 - b_4}{2}\right) \qquad (4.4)$$

The equation of the bridge balance will then be:

$$Y_{AB} Y_{CD} = Y_{AD} Y_{CD}$$

or:

$$\left[(G+g_1) + j\left(B_0 + \frac{b_1 - b_3}{2}\right)\right]\left[(G+g_3 - \frac{g}{2}) + j\left(B_0 - \frac{b_1 - b_3}{2}\right)\right] = \left[(G+g_2 + \frac{g}{2}) + j\left(B_0 + \frac{b_2 - b_4}{2}\right)\right]\left[(G+g_4) + j\left(B_0 - \frac{b_2 - b_4}{2}\right)\right] \qquad (5)$$

The real term of the Equation 5 is:

$$Gg_1 - Gg_2 + Gg_3 - Gg_4 - Gg + g_1g_3 - g_2g_4 - \frac{g}{2}(g_1 + g_4) + \left(\frac{b_1 - b_3}{2}\right)^2 - \left(\frac{b_2 - b_4}{2}\right)^2 = 0$$

Dividing by $G$ and rearranging:

$$g = (g_1 + g_3) - (g_2 + g_4) + \frac{g_1 g_3 - g_2 g_4}{G} - \frac{g(g_1 + g_4)}{2G} + \frac{(b_1 - b_3)^2 - (b_2 - b_4)^2}{4G} \qquad (6)$$

where "$g$" is the value read from the conductance dial of the bridge at balance.

It will be noted that in Equation 6 the expression $(g_1 + g_3) - (g_2 + g_4)$ is, by definition, the conductance unbalance of a four-branch network. The difference between this expression and Equation 6, therefore, is the measurement error E in mhos:

$$E = \frac{g_1 g_3 - g_2 g_4}{G} - \frac{g(g_1 + g_4)}{2G} + \frac{(b_1 - b_3)^2 - (b_2 - b_4)^2}{4G} \qquad (7)$$

In four-terminal crystal networks the conductances $g_1$ to $g_4$ are all very small, for if they are of appreciable value the crystal plate is defective. On the other hand the bridge conductance G is of a comparatively very large value. In the first term of the right side of Equation 7 the numerator is the difference between two very small quantities and the denominator is relatively a very large quantity. This first term, therefore, is so small that it may be disregarded. In the second term, $(g_1 + g_4)$ is ordinarily very small and becomes comparable with small $g$ only in a defective network. This term, therefore, may be considered as having a maximum value of $g^2/2G$. The value of $g$, however, is limited by the conductance range of the bridge, and it is made very small compared with the total conductance 2G of the associated bridge arms; hence the second term also may be disregarded and the measurement error can be written very approximately as:

$$E \cong \frac{(b_1 - b_3)^2 - (b_2 - b_4)^2}{4G} \qquad (8)$$

As the numerator of Equation 8 is a difference of two differences in square power, this term is never greater than the square of the greater of the two components. Assuming that the greater difference is equal to "$\Delta b$," we obtain a simplified expression for the maximum measurement error:

$$E \simeq \frac{\Delta b^2}{4G} \qquad (8.1)$$

where: $\Delta b$ is the greater value in micromhos of two differences $$(b_1-b_3) \text{ and } (b_2-b_4)$$

From Equation 8.1 it is evident that a measuring network of the type shown in Fig. 2 gives satisfactory accuracy for conductance measurements of four-terminal networks if the capacity unbalance of the network is small. If it becomes of the order of one micro-microfarad or greater however, the measurement error increases appreciably and the utility of the circuit is correspondingly limited.

Since the first two right side terms of Equation 7 have been shown to be negligible, it also is evident that the total measurement error is negligible for any values of $b_1$ to $b_4$ as long as the susceptance differences $(b_1-b_3)$ and $(b_2-b_4)$ are equal. As stated above, an important feature of the present invention is a practicable means for making these susceptance differences equal.

When a bridge such as that of Fig. 2 is balanced for susceptance by adjusting two condensers connected respectively across the arms of an opposite pair, two facts are evident:

1. The susceptance differences between the opposite bridge arms remain constant as will be seen by noting the difference between irreal parts of Equations 4.1 and 4.3 and of Equations 4.2 and 4.4 respectively, from which it follows that:

$$B_{AB}-B_{CD}(b_1-b_3) = \text{a constant} \qquad (10)$$

$$B_{AD}-B_{BC}=(b_2-b_4) = \text{a constant} \qquad (11)$$

2. The sums of the susceptances of the opposite bridge arms are equal, as will be seen by adding the irreal terms of Equations 4.1 and 4.3 and of Equations 4.2 and 4.4, respectively, to obtain:

$$B_{AB}+B_{CD}=B_{AD}+B_{BC} \qquad (12)$$

The circuit of Fig. 1 is basically similar to that of Fig. 2 except that for clarity no network to be measured is shown and certain elements have been added to the bridge as will be explained. The bridge has four arms, each of conductance G and an input transformer 10, for applying alternating potential to the terminals BD, and a second transformer 11 associated with terminals A and C for operating a balance indicator 12. Ganged variable condensers 13 and 14 are connected across the AB and DC arms respectively, for making a susceptance balance in the known manner. The residual conductance unbalance of the circuit is adjusted by potentiometer 15 and the measured conductance unbalance is read from a dial associated with a potentiometer 16, all as in the known type of bridge referred to above.

The added condensers 17 and 18 cross the arms AD and BC respectively, are differentially ganged as indicated so that, as the common control is operated, susceptance is added to one arm and subtracted from the other in equal increments. If the control is operated so that a susceptance "$d$" is added to arm $B_{AD}$ and subtracted from arm $B_{BC}$, it will be apparent that Equations 11 and 12 are maintained and that the susceptance balance of the bridge also is maintained without change in the setting of the condensers 13 and 14. Since "$d$" may be of any arbitrary value, it may be chosen so that:

$$B_{AB}-B_{CD}=B'_{AD}-B'_{BC} \qquad (13)$$

where $$B'_{AD}=B_{AD}+d$$

and $$B'_{BC}=B_{BC}-d$$

From Equations 10, 11 and 13:

$$b_1-b_3=b_2-b_4+2d \qquad (13.1)$$

From which $$d=\frac{(b_1-b_3)-(b_2-b_4)}{2} \qquad (14)$$

Since Equation 13 fulfills the condition $(b_1-b_3)=(b_2-b_4)$, it follows that by choosing the value of "$d$" as expressed in Equation 14, the significant part of the measurement error of Equation 7 can be eliminated.

From Equations 4.2 and 14:

$$B'_{AD}=B_{AD}+d=B_0+\frac{b_2-b_4}{2}+$$

$$\frac{(b_1-b_3)-(b_2-b_4)}{2}=B_0+\frac{b_1-b_3}{2}$$

$$(15)$$

This latter expression is equal to the susceptance across arm AB as given in Equation 4.1. Similarly, the susceptance across arm BC after subtracting "$d$" is equal to the susceptance across arm DC after adjusting condensers 13 and 14. The proper value of "$d$," therefore, is readily found merely by adjusting the condensers 17 and 18 until the total susceptance of the arm AD is equal to that of arm AB, and the total susceptance of arm BC is equal to that of arm CD. Since these condensers are ganged, these adjustments are made simultaneously and only one additional bridge balance, using the auxiliary arms 19 and 20, is required.

Before the circuit of Fig. 1 is used to make conductance unbalance measurements on four-terminal networks, it is of course necessary to balance the bridge circuit in accordance with the usual testing procedure. With the key 21 closed on contact 22 and the potentiometer 16 set to zero, the condensers 13 and 14 are adjusted for susceptance balance and the potentiometer 15 is varied until minimum deflection is shown by the indicator 12. The key is then closed on contact 23 and the auxiliary bridges are balanced to minimum deflection by readjusting the condensers 17 and 18 and varying the control 24 associated with the auxiliary bridge arms 19 and 20. These operations are repeated, if necessary, until minimum deflection is obtained with the key in either position.

The four terminals of a network, such as that shown in Fig. 3, are then connected to the corresponding terminals of the bridge so that the admittances of the network are in parallel with the bridge arms as shown in Fig. 2. The key 21 is then closed on contact 22 and a susceptance balance is obtained by readjusting the ganged condensers 13 and 14, and if necessary, by resetting the potentiometer 16, to obtain minimum deflection. The key is then moved to contact 23 and, without disturbing any previous adjustments, the differentially ganged condensers 17 and 18 are set to give minimum deflection thereby determining the value of "d" for minimum measurement error. The key is then returned to contact 22 and a conductance balance is obtained by adjusting the potentiometer 16, and the value of the conductance unbalance in the network is read on the associated dial in the usual manner. When the bridge circuit has been adjusted in the manner outlined above, a number of such networks may be measured before it is necessary to re-check the bridge balance.

It will be understood that the condensers 17 and 18 are ganged only for convenience to avoid having to make two auxiliary balances and that, if desired, these condensers may be adjusted separately. If they are not ganged, the procedure described above adjusts only condenser 17 to equality with condenser 13. To adjust condenser 18 to equality with condenser 14, it would be necessary to provide facilities for disconnecting the indicator lead 25 from the bridge terminal 26 and connecting it to terminal 27. Then with the key 21 on contact 23, the second auxiliary bridge, including the two right arms of the main bridge, is balanced in a similar manner by adjusting condenser 18.

In addition to its higher accuracy of measurement, this circuit has several other advantages. The tracking of condensers 13 and 14 is not critical nor is it necessary that the direct capacitances across the bridge arms be carefully equalized since any small capacity differences between the arms are balanced out by the adjustment of the condensers 17 and 18. As these latter condensers are required to cover only the susceptance unbalance range between opposite bridge corners, and this range is ordinarily quite small, the required degree of accuracy in the tracking of these condensers can be obtained without difficulty.

As the numerator of the most significant term in the measurement error given by Equation 7 is reduced to zero in this circuit, the ratio arm conductance G of the bridge may be of a smaller value than in previous circuits thereby reducing the differential sensitivity requirement. It also will be apparent that, in cases where the prior measuring procedure is adquate, the key 21 may be left on contact 22 and the new circuit operated in exactly the same manner as the old.

While the invention has been described with particular reference to a circuit for measuring conductive unbalance in the presence of susceptance unbalance, the general principles of the invention, as mentioned above, are equally applicable to a bridge for measuring susceptance unbalance in networks having sufficient conductance unbalance to impair the accuracy of measurement. If in Fig. 1 all capacitances and conductances are replaced by conductances and capacitances respectively of similar admittance magnitudes and these admittance counterparts are connected in the same general manner as the circuit of Fig. 1, the susceptance counterpart of Equation 6, as read on the susceptance dial, will be:

$$b = (b_1 + b_3) - (b_2 + b_4) + \frac{b_1 b_3 - b_4}{B} - \frac{b(b_1 + b_4)}{2B} + \frac{(g_1 - g_3)^2 - (g_2 - g_4)^2}{4B}$$

This may be done as shown in Fig. 6, by replacing capacitances 13, 14, 17, and 18 by conductances 33, 34, 37, and 38, respectively, replacing the conductance elements G with capacitances B, and by substituting variable capacitances 35 and 36 for potentiometers 15 and 16. The modified bridge, therefore, can be used to measure accurately small susceptance unbalances in low "Q" four-terminal networks, such as resistor networks which have conductance unbalances too large to permit the use of prior measuring techniques.

It will be understood that the methods and apparatus described are merely illustrative of the general principles of the invention and that various other modifications embodying these principles and falling within the scope of the invention will occur to those skilled in the art.

What is claimed is:

1. In a bridge system, the combination with a main bridge having four admittance arms, a source of alternating potential connected across one diagonal of the bridge, a balance indicator for connection across the other diagonal of the bridge and two adjustable admittance component elements in two opposite arms for balancing the bridge for said admittance component, of two other adjustable elements of the same admittance component in the other two opposite arms, a pair of auxiliary ratio arms serially connected across said one diagonal of the main bridge to form an auxiliary bridge including one pair of adjacent arms of the main bridge, and a switch for selectively connecting the indicator to the main bridge or to the auxiliary bridge.

2. In a measuring system, a bridge having four admittance arms and two variable admittance component elements connected across the two arms of one opposite pair and ganged differentially to vary the effective values of the component elements in opposite directions by equal increments.

3. In a measuring system, the combination with a bridge having four admittance arms and a pair of admittance component elements connected respectively across the arms of one opposite pair and ganged to vary the effective values of said component across the two arms of the pair in the same direction by equal increments, of a second pair of elements of the same admittance component connected respectively across the arms of the other opposite pair, and ganged differentially to vary the effective values of said component across the arms of the other pair in opposite directions by equal increments.

4. The method of eliminating measurement error due to unbalances of one admittance component when measuring the unbalance in the other admittance component of four terminal networks having their terminals connected to an admittance bridge having variable admittance elements, which method comprises first adjusting the bridge to balance essentially only for the said one admittance component, and then differentially varying the value of said one component in one pair of opposite arms until said one component in each of the said opposite arms is equal in value to the said one component in corresponding adjacent arms.

5. The method of measuring the unbalance in one admittance component of a four-terminal network having its terminals connected to the four corners of an admittance bridge which method comprises first adjusting the values of the other admittance component to make the sum of the other said component across each pair of opposite arms equal, next varying differentially the other component across a pair of opposite arms to make the differences of the said other component across each pair of opposite arms equal, and then determining the unbalance in the component being measured.

6. In the method of measuring unbalance in one of the two admittance components of a four-terminal network having its terminals connected to the four corners of an admittance bridge to form a composite network, the steps of eliminating measurement error due to unbalance in the other admittance component which comprises first balancing the composite network essentially for the other of the two components by making the sums of the said other component in the two pairs of opposite branches of the network equal, and then varying the other component in the network to make the difference between said other component in one pair of opposite branches equal to the difference between said other component in the other pair of opposite branches, while maintaining the said equality of sums.

7. In the method of measuring conductance unbalance in a four-terminal network having susceptance unbalance, wherein the network terminals are connected to the four corners of an admittance bridge to form a composite network, the steps of eliminating measurement error due to the susceptance unbalance which comprises first balancing the composite network essentially for susceptance by making the sums of the susceptance component in the two pairs of opposite branches of the network equal, and then varying the susceptance in the network to make the difference between the susceptance values in one pair of opposite branches equal to the difference between the susceptance values in the other pair of opposite branches, while maintaining the said equality of sums.

8. In the method of measuring susceptance unbalance in a four-terminal network having conductance unbalance, wherein the network terminals are connected to the four corners of an admittance bridge to forms a composite network, the steps of eliminating measurement error due to the conductance unbalance which comprises first balancing the composite network essentially for conductance by making the sums of the conductance component in the two pairs of opposite branches of the network equal, and then varying the conductance in the network to make the difference between the conductance values in one pair of opposite branches equal to the difference between the conductance values in the other pair of opposite branches, while maintaining the said equality of sums.

9. The method of operating a bridge having four impedance arms, to measure unbalance in one only of the two admittance components of a four-terminal network connected to the bridge to form a composite network, which method comprises first balancing the composite network essentially for the other of the two components by making the sums of the said other component in the two pairs of opposite branches of the network equal, next varying the other component in the network to make the difference between said other component in one pair of opposite branches equal to the difference between said other component in the other pair of opposite branches, while maintaining the said equality of sums, and then balancing the composite network for the said one component only.

10. A method of measuring conductance unbalance in a four-terminal network having susceptance unbalance, wherein the network terminals are connected to the four corners of an admittance bridge to form a composite network, said method comprising first balancing the composite network essentially for susceptance by making the sums of the susceptance component in the two pairs of opposite branches of the network equal, next varying the susceptance in the network to make the difference between the susceptance values in one pair of opposite branches equal to the difference between the susceptance values in the other pair of opposite branches, while maintaining the said equality of sums, and then balancing the composite network for conductance only.

11. A method of measuring susceptance unbalance in a four-terminal network having conductance unbalance, wherein the network terminals are connected to the four corners of an admittance bridge to form a composite network, the said method comprising first balancing the composite network essentially for conductance by making the sums of the conductance component in the two pairs of opposite branches of the network equal, next varying the conductance in the network to make the difference between the conductance values in one pair of opposite branches equal to the difference between the conductance values in the other pair of opposite branches, while maintaining the said equality of sums, and then balancing the composite network for susceptance only.

12. In a bridge system, the combination with a main bridge having four admittance arms, a source of alternating potential connected across one diagonal of the bridge, and a balance indicator for connection across the other diagonal of the bridge, of means for varying the values of one of the two admittance components in one pair of bridge arms to make the sums of said values across the two pairs of opposite arms equal, means for varying the said admittance component values of one pair of arms to equalize the difference between these values in each of the two pairs of arms, and means for detecting said condition of difference equalization.

13. In a bridge system, the combination with a main bridge having four admittance arms, a source of alternating potential connected across one diagonal of the bridge, and a balance indicator for connection across the other diagonal of the bridge, of means for varying the values of one of the two admittance components in one pair of bridge arms to make the sums of said values across the two pairs of opposite arms equal, means for varying the said admittance component values in one pair of arms to equalize the difference between these values in each of the two pairs of arms, a pair of auxiliary ratio arms serially connected across a diagonal of the main bridge to form an auxiliary bridge including one pair of adjacent arms of the main bridge, and a switch for selectively enabling the indicator to operate with the main bridge or with the auxiliary bridge.

14. Apparatus according to claim 1 in which the first two admittance component elements are coupled to vary the effective values of said component across the two arms in its pair in the same direction by equal increments, and the two other elements are coupled to vary the effective values of said component across the two arms of the other pair in opposite directions by equal increments.

15. In a bridge system, the combination with a main bridge having four admittance arms, a source of alternating potential connected across one diagonal of the bridge, a balance indicator for connection across the other diagonal of the bridge and two adjustable admittance component elements in a pair of opposite arms for balancing the bridge for said admittance component, of two other adjustable elements of the same admittance componene in the same pair of opposite arms, a pair of auxiliary ratio arms serially connected across a diagonal of the main bridge to form an auxiliary bridge including one pair of adjacent arms of the main bridge, and a switch for selectively connecting the indicator or the source to the main bridge or to the auxiliary bridge.

16. Apparatus according to claim 15 in which the first two admittance component elements are coupled to vary the effective values of said component across the two arms of the pair in the same direction by equal increments, and the two other elements are coupled to vary the effective values of said component across the two arms of the pair in opposite directions by equal increments.

BOGUMIL M. WOJCIECHOWSKI.

REFERENCES CITED

The following references are of record in the file of this patent:

UNITED STATES PATENTS

| Number    | Name    | Date          |
|-----------|---------|---------------|
| 1,665,397 | Wunsch  | Apr. 10, 1928 |
| 1,732,311 | Nyquist | Oct. 22, 1929 |
| 2,326,274 | Young   | Aug. 10, 1943 |

FOREIGN PATENTS

| Number  | Country       | Date          |
|---------|---------------|---------------|
| 483,023 | Great Britain | Apr. 11, 1938 |

OTHER REFERENCES

Herborn: Bell Lab.'s Record, February 1948 pages 73-76.